(12) United States Patent
Nguyen et al.

(10) Patent No.: US 6,771,638 B1
(45) Date of Patent: *Aug. 3, 2004

(54) SYSTEM AND METHOD FOR TEMPORARY DATA TRANSFER

(75) Inventors: Thai Nguyen, Thornton, CO (US); Michael Leonhardt, Longmont, CO (US); Charles A. Milligan, Golden, CO (US); Steven McCown, Brighton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/542,526

(22) Filed: Apr. 4, 2000

Related U.S. Application Data

(63) Continuation of application No. 09/107,341, filed on Jun. 30, 1998, now Pat. No. 6,084,874.

(51) Int. Cl.[7] .......................... H04L 12/66; H04L 12/28
(52) U.S. Cl. ...................... 370/352; 370/410; 370/431
(58) Field of Search ................................ 370/352–356, 370/431, 437, 401, 410, 230, 235, 236, 252, 465, 377

(56) References Cited

U.S. PATENT DOCUMENTS

| | | |
|---|---|---|
| 4,797,878 A | 1/1989 | Armstrong |
| 4,817,114 A | 3/1989 | Boer et al. |
| 4,996,685 A | 2/1991 | Farese et al. |
| 5,355,365 A | 10/1994 | Bhat et al. |
| 5,446,730 A | 8/1995 | Lee et al. |
| 5,608,733 A | 3/1997 | Vallee et al. |
| 5,617,417 A | 4/1997 | Sathe et al. |
| 5,644,715 A * | 7/1997 | Baugher ..................... 709/228 |
| 5,701,465 A | 12/1997 | Baugher et al. |
| 5,812,768 A | 9/1998 | Page et al. |
| 5,815,665 A | 9/1998 | Teper et al. |
| 5,875,306 A | 2/1999 | Bereiter |
| 5,898,668 A | 4/1999 | Shaffer |
| 5,898,673 A * | 4/1999 | Riggan et al. .............. 370/237 |
| 5,983,272 A * | 11/1999 | Rosen et al. ................ 709/227 |
| 6,018,767 A * | 1/2000 | Fijolek et al. .............. 709/218 |
| 6,104,720 A * | 8/2000 | Kisor ......................... 370/431 |

* cited by examiner

*Primary Examiner*—Andy Lee
(74) *Attorney, Agent, or Firm*—Brooks Kushman P.C.

(57) ABSTRACT

A communication system permitting temporary connections for specific, predictable data transfer performance is presented. The communication system includes a requesting computer system, a responding computer system, and communication paths for establishing connections between the requesting computer system and the responding computer system. The requesting computer system can establish a temporary initial control connection with the responding computer system through a first communication path. A temporary negotiating connection is established with the responding computer system. Data transfer characteristics are negotiated with the responding computer using the temporary negotiating connection. A temporary data connection is established through a set including at least one communication path based on the negotiated data transfer characteristics, the set not including the first communication path.

16 Claims, 5 Drawing Sheets

SYSTEM AND METHOD FOR TEMPORARY DATA TRANSFER

CROSS-REFERENCE TO RELATED APPLICATION

This application is a continuation of U.S. patent application Ser. No. 09/107,341, now U.S. Pat. No. 6,084,874, filed Jun. 30, 1998, titled "Temporary Data Transfer Connections," the specification of which is expressly incorporated herein by reference in its entirety.

TECHNICAL FIELD

The present invention relates to establishing and controlling connections for data transfer.

BACKGROUND ART

An increasing amount of information is being made available for access using computers. In addition to the amount of data available, the format of information is moving from purely text-based to multimedia-based, requiring still more data to express the information. Much of this information can be accessed through the internet. Other information is available through private networks or by direct connection to a data supplier.

One difficulty with networks such as the internet is the unpredictability of data transfer rates. Data throughput is often limited to a greater extent by the network than by the requester and the supplier. Since paths through the internet are connectionless, the data transfer performance is not known with any certainty, may fluctuate wildly, and cannot be guaranteed to meet any specified performance level.

Another difficulty is the serial nature of handling multiple tasks. A user must wait for the completion of data transfer for a current task before initiating another task. For example, consider a user attempting to download information from multiple internet sites. The second connection, request for data, and data transfer cannot be initiated or completed until the data from the first request has been received. Likewise, third and subsequent accesses must be sequential.

A further difficulty is the generally low rate of data transfer, forcing a user of a requesting computer system to wait several seconds to several minutes for an amount of data sufficient to permit the user to begin interpreting the data. Typically, a modem is used to transfer data over a telecommunication network. A modem for a conventional analog telephone line limits data rates to at most 56 Kb/s under current technology. Alternate technologies, such as ISDN, ADSL, and cable modems provide increased data rates but are expensive and are not available in many locations.

To increase data rates in locations with more than one analog phone line, the data may be disassembled into multiple streams and sent concurrently over several modems. In this case, similar resources are used. However, there may also be a mixture of resources such as analog phone lines, ISDN, ADSL, cable modems, and the like available during pauses in their primary application work stream. As in the multiple analog telephone line case, these temporarily available dissimilar resources have the potential of being shared to increase communications performance. In all cases, the receiver must have the same number of modems available and must be able to reassemble the data into its original sequence. These techniques are known as inverse multiplexing and modem striping. One problem with such techniques is that both the requester and the responder must have compatible equipment. Another problem is that dynamic allocation of communication resources based on factors such as changing resource supply and demand is not supported. Yet another problem that automatic establishment of control and data paths is not supported.

What is needed is the ability to demand temporary use of data communication resources to ensure specific, predictable data transfer performance.

SUMMARY OF THE INVENTION

It is an object of the present invention to provide a user temporary use of resources on demand.

Another object of the present invention is to provide the user specific levels of data transfer performance.

Still another object of the present invention is to provide to the user predictable data transfer bandwidth on demand.

Yet another object of the present invention is to provide the ability to use multiple connections to provide specific, predictable data transfer performance, the connections capable of operating in parallel.

A further object of the present invention is to allow a control connection to be maintained throughout the data transfer or to allow the control connection to be dropped once data transfer is negotiated.

A still further object of the present invention is to provide a control connection capable of establishing the performance level of the data link.

Yet a further object of the present invention is to provide dynamic configuration and management of communication resources.

An additional object of the present invention is to allocate communication resources dynamically.

Yet an additional object of the present invention is to accomplish communication operations automatically, without user intervention.

In carrying out the above objects and other objects and features of the present invention, a communication system is presented. The communication system includes a requesting computer system, a responding computer system, and communication paths for establishing connections between the requesting computer system and the responding computer system. The requesting computer system can establish a temporary initial control connection with the responding computer system through a first communication path. A temporary negotiating connection is established with the responding computer system. Data transfer characteristics are negotiated with the responding computer using the temporary negotiating connection. A temporary data connection is established through a set including at least one communication path based on the negotiated data transfer characteristics, the set not including the first communication path.

In one embodiment of the present invention, the communication system includes a second responding computer system. The requesting computer system can break the initial control connection with the first responding computer system once the negotiating control connection is established and can establish a temporary initial control connection with the second responding computer system, thereby permitting access to the second responding computer system in parallel with completion of negotiating data transfer characteristics and establishing the temporary data connection.

In another embodiment of the present invention, the responding computer system does not hold the data requested by the requesting computer system. The communication system includes at least one library system, the data requested by the requesting computer system being held within one of the library systems. In a refinement, each library system determines if the requested data is held within and, if so, sends the data using the established connection. If the requested data is not held within, each library system establishes a connection to a selected library system and inquires if the requested data is held within.

A method is also provided for communication between a requesting computer system and a responding computer system. The method includes establishing an initial control connection between the requesting computer system and the responding computer system through a first communication path, establishing a negotiating control connection between the requesting computer system and the responding computer system through a second set of including at least one communication path, negotiating data transfer characteristics between the requesting computer system and the responding computer system through the negotiating control connection, establishing a temporary data connection between the requesting computer system and the responding computer system using a third set of at least one communication path, the selection of the at least one communication path based on the negotiated data transfer characteristics, and transferring data between the responding computer system and the requesting computer system using the established temporary data connection.

Various negotiating control embodiments are described. The negotiating control connection can be broken after establishing the data connection. The negotiating control connection can be reestablished after data has been transferred.

In another embodiment, security measures to be used in establishing a temporary data connection and in transferring data are determined during negotiating data transfer characteristics.

In yet another embodiment, paths are dynamically allocated during data transfer based upon at least one parameter from a set of parameters comprising number of paths, types of paths, cost of using paths, usage of paths, demand for paths, and user preferences.

A communication system is also described which includes a requesting computer system requesting data to be transferred at a specified level of data transfer performance, a responding computer system, at least one broker system, and a plurality of communication paths between the requesting computer system and the responding computer system, between the responding computer system and each of the at least one broker system, and between one of the at least one broker system and any other of the at least one broker system. The requesting computer system automatically establishes a first control connection with the requestor system through a first path and transmits the specified level of data transfer performance through the first control connection. The responding computer system determines if it is capable of transferring the requested data at the specified level of data transfer performance and, if so to transfer the requested data to the requesting computer. Otherwise a second control connection is established with a selected broker system and the requested data is transferred to one of the broker systems. Each broker system can determine if it is capable of transferring the requested data at the specified level of data transfer performance and, if so, transfer the requested data to the requesting computer system. Otherwise the broker system establishes a broker-to-broker control connection with a selected broker system and transfers the requested data to the selected broker system. The responding computer system and any broker system capable of transferring data to the requesting computer system can establish a temporary initial control connection with the requesting computer system, establish a temporary negotiating connection with the requesting computer system, negotiate data transfer characteristics with the requesting computer system, and establish a temporary data connection with the requesting computer system.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
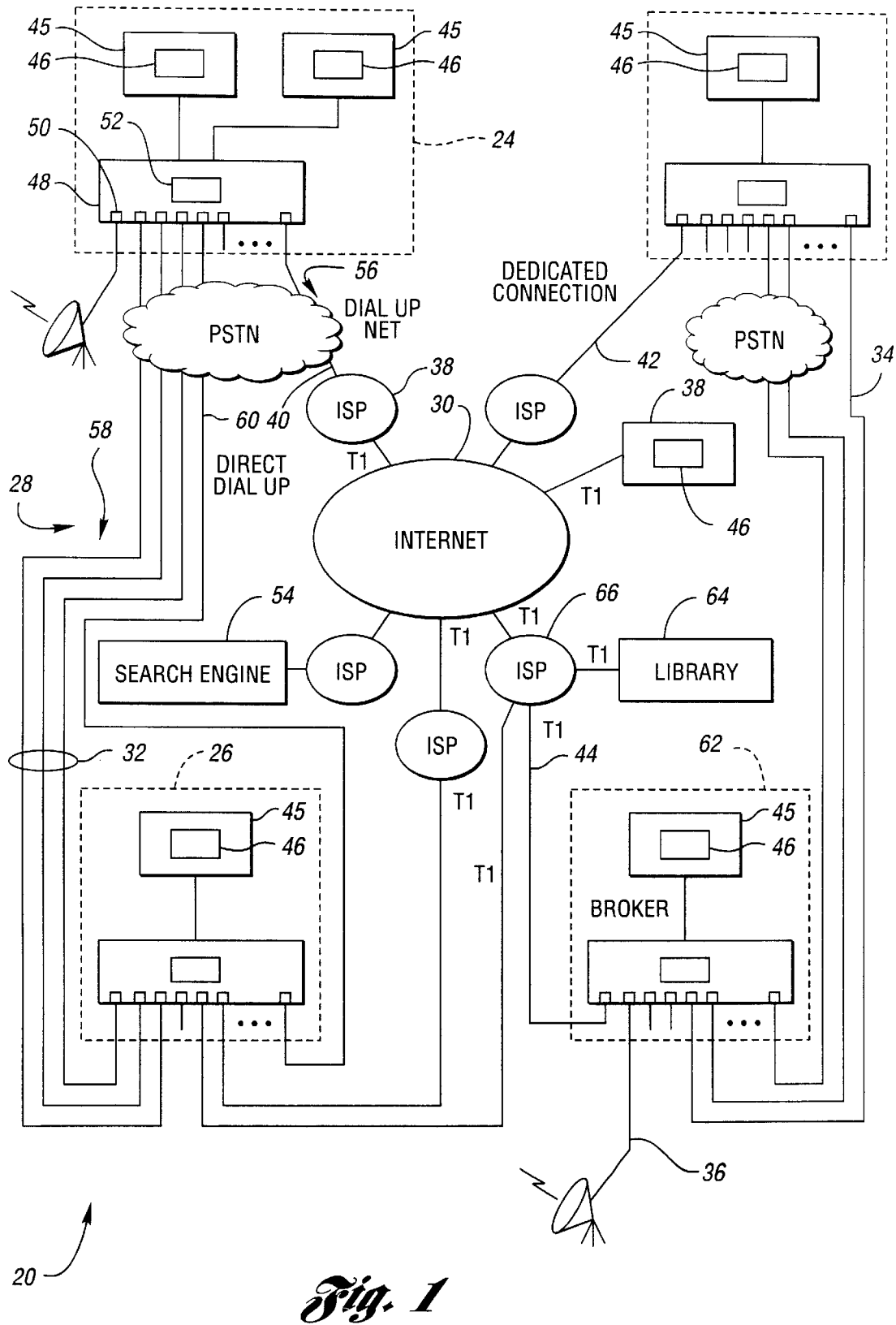
FIG. 1 is a schematic diagram of an illustrative communication system according to the present invention.

Referring now to FIG. 1, a schematic diagram of an illustrative communication system according to the present invention is shown. Communication system 20 is capable of providing multiple connections between a plurality of computer systems, two of which are indicated as requesting computer system 24 and responding computer system 26.

Communication system 20 includes a large number of communication paths, shown generally as 28, for forming connections between any two computer systems, such as 24 and 26, that are part of communication system 20. Communications paths 28 may be through a variety of media and sources, including the internet 30, direct dial-up 32 between computers using a telecommunications network such as the public switched telephone network (PSTN), dedicated link 34, satellite link 36, or the like. Connections to the internet 30 are generally through an internet service provider (ISP), one of which is shown by 38, and include dial-up 40, dedicated connection 42, T1 line 44, and the like.

Computer systems 24,26 in communication system 20 may include one or more host systems 45. Each host system 45 may have at least one application, one of which is indicated by 46, which can generate requests for data, respond to requests for data, broker data, broker communication services, serve as a search engine, serve as ISP 38, or any combination of the above. A computer system, such as 24, operative to use the present invention also has interface 48. Interface 48 includes hardware components, one of which is shown by 50, allowing computer 24 to connect with paths 28 in communication system 20. Interface 48 also includes control logic 52 for performing the present invention. Control logic 52 may be implemented in hardware, software, or a combination of hardware and software. In computer system 24, host 45 and interface 48 may be implemented as a single computer, each in a separate computer, or distributed throughout computers in a network.

Requesting computer system 24 generates at least one data request. Each request may be to receive data, to send data, or a combination of both. Each request may involve more than one responding computer system 26. The location of each responding computer system 26 may be known to requesting computer system 24 or may be discovered such as, for example, by use of internet search engine 54.

Once the location of responding computer system 26 is known, an initial control connection, shown generally as 56, is established between requesting computer system 24 and responding computer system 26 through one or more paths 28 in computer system 20.

In a preferred embodiment, requesting computer system 24 can determine if responding computer system 26 can negotiate using the present invention. If responding computer cannot negotiate using the present invention, several alternatives are available. One alternative is to communicate using a method other than the present invention. Another alternative is to use a broker system as described below. In a preferred embodiment, initial control connection 56, is through the internet 30. In alternative embodiments, any other path 28 through communication system 20 may be used.

In one embodiment, requesting computer system 24 can negotiate with responding computer system 26 over initial control connection 56. In an alternative embodiment, a separate control connection 56 is established for negotiation. Negotiations can be used to determine the type of subsequent connections, such as connection for the next level of control and negotiation, the type and number of data paths, data transfer performance levels, and security measures.

Requesting computer system 24 negotiates a level of performance for data transfer with responding computer system 26. This level of performance can be based on one or more of user preferences, communication resource capacity and availability, and quantity of data to be transferred.

Once the level of performance for data transfer has been determined, requesting computer system 24 establishes temporary data connection, shown generally by 58, using at least one path 28 through communication system 20. Data connection 58 may or may not use the path established for initial control connection 56. In a preferred embodiment, the at least one path 28 is through modems in requesting computer system 24, a plurality of telecommunication lines 32, and modems in responding computer system 26. The use of connection oriented lines provides a predictable data transfer rate. If supported, additional data connections 58 may be added to obtain the desired data rate. Once at least one data connection 58 is established, data transfer may begin.

In a preferred embodiment, control logic 52 can function as a medium manager, managing connection resources to communication system 20. Connections may include standard telephone (POTS), ISDN, ADSL, and the like. Control logic 52 could dynamically allocate connection paths between different concurrent data transfers for one application 46, between more than one application 46, and between at least one application 46 and additional operations such as telephone calls, fax transfers, video conferencing, and the like. Control logic 52 will incorporate rules to determine connection resource allocation based upon information supplied by one or more of the users, application 46, and negotiation between requesting computer system 24 and responding computer system 26. Allocation may be based on one or more of a variety of factors including number of communication paths, types of communication paths, cost of using communication paths, usage of communication paths, demand for communication paths, user preferences data set size, user class, user load, host type, time of day, date, and the like.

Control logic 52 may also function as a control manager, managing control connection 56 and its interaction with data connection 58. Several types of control connections are allowed in the present invention. In the first type, control connection 56 is maintained throughout data transfer. In the second type, control connection 56 is dropped or redirected after data transfer is initiated and is not reestablished with regards to this data transfer. This allows requesting computer system 24 to use control connection 56 to establish another data transfer concurrent with ongoing transfers. In the third type, control connection 56 is dropped or redirected after data transfer is initiated and is reestablished when data transfer is completed. This allows requesting computer system 24 to verify data transfer and to request additional data from the same responding computer system 26. Additionally, control connection 56 may be initiated using a first medium and then may switch to or be reestablished on a second medium. For example, control connection 56 may be established through the internet 30 then, once data connection 58 has been established over dial-up lines 32, may be switched to dial up connection 58 or an additional dial-up line as indicated by 60. Terminating control could have the format indicating data transfer completion status as is used in the file transfer protocol (FTP) or could establish a private browser to web server connection for further downloads from responding computer system 26.

In a preferred embodiment, requesting computer system 24 and responding computer system 26 can establish a fault tolerant transmission delivery rate. The techniques that may be used to implement a fault tolerant transmission include data mirroring and parity checking used either over the entire data stream or over data transferred along each data connection 58 and, for packetized data, automatic retry for missing packets. Error recovery and data reconstruction may take place in real time or off-line.

In a preferred embodiment, communication system 20 further includes broker systems and library systems. Broker systems, one of which is indicated by 62, respond to requests from requesting computer system 24, but may not have the requested data. Library systems, one of which is shown by 64, have requested data but may not be able to transfer the data directly to requesting system 24 using the present invention.

In one embodiment, requesting computer system 24 seeks to connect with library system 64. Library system 64 is not capable of practicing the present invention. Requesting computer system 24 establishes control connection 56 with broker system 62, which is capable of practicing the present invention and has a high-speed connection with library system 64. The high speed connection may result because broker system 62 and library system 64 share ISP 66, because library system 64 is part of ISP 66, or from other configurations. Broker system 62 then functions as responding computer system 26, passing data to or from library system 64 from or to requesting computer system 24. It should be noted that library system 64 may be incapable of practicing the present invention for several reasons, including that the technology does not exist on library system 64, the technology is not operative on library system 64, or that data paths in library system 64 accessible by requesting computer system 24 are in use.

Figure 2:
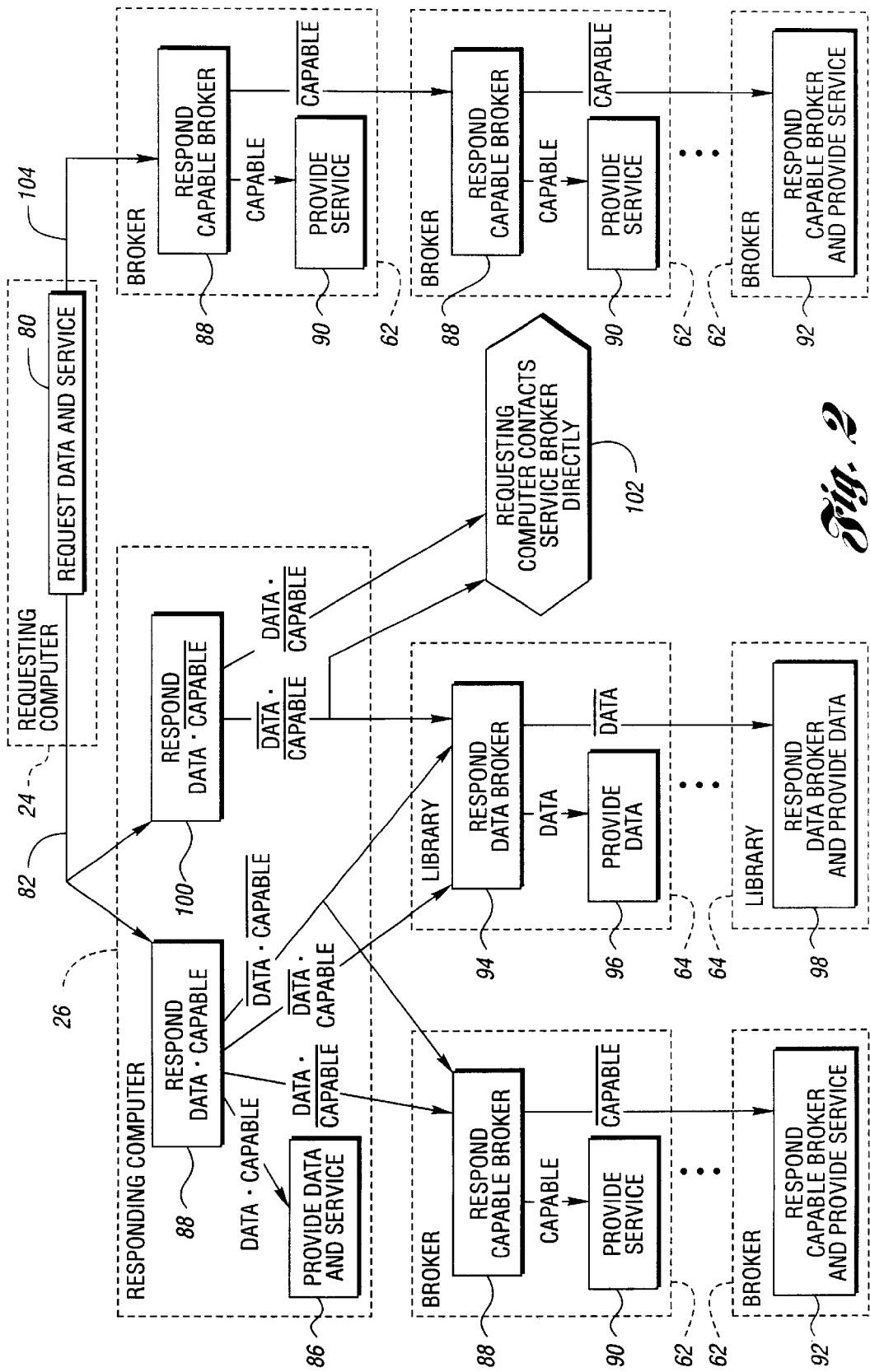
FIG. 2 is a block diagram illustrating operations for service and data brokering according to an embodiment of the present invention.

Referring now to FIG. 2, a block diagram illustrating operations for service and data brokering according to an embodiment of the present invention is shown. Responding computer system 26 may have the ability to find library system 64 containing data requested by requesting computer system 24 if responding computer system 26 does not have the data. This ability is known as data brokering. Also, responding computer system 26 may have the ability to find service broker system 62 capable of providing connection services according to the present invention requested by requesting computer system 24 if responding computer system 26 is not capable of performing the services. This ability is known as service brokering. Brokering may be automatically implemented by responding computer system 26 without the knowledge of requesting computer system 24 or may be requested directly by requesting computer system 24.

Requesting computer system 24 desires particular data. Requesting computer system 24 may also desire that the data be delivered using particular media at a predictable and specified level of performance. This is expressed as request 80. Initially, this request may be placed with responding computer system 26, as shown by 82. If responding computer system 26 answers request 80 by indicating that no access to the data is possible, requesting computer 26 must seek an alternative responding computer system 26.

If responding computer system 26 answers request 80 by indicating that the data can be accessed and capability to provide the service is available, as shown in block 84, four cases exist. In the first case, responding computer system 26 has the data and is capable of providing the service. In this case, responding computer system 26 delivers the data to requesting computer system 24 directly, as indicated by block 86.

In the second case, responding computer system 26 has the requested data but cannot supply the connection service. This latter event may occur if responding computer system 26 cannot implement the present invention, does not possess the necessary resources, has too few resources free, or the like. In this situation, responding computer system 26 automatically contacts broker system 62. If broker system 62 responds that it is not capable, responding computer system 26 contacts another broker system 62. Broker system 62 indicating the capability to provide the service, as shown by block 88, may actually provide the service, as shown by block 90, or may acquire the service from an additional broker system 62, as shown by block 92. The data is then sent from responding computer system 26 to capable broker system 62 which forwards the data to requesting computer system 24.

In the third case, responding computer system 26 can supply the connection service but does not have the requested data. In this situation, responding computer system 26 automatically contacts a selected library system 64. Library system 64 can determine if the requested data is held within. If library system 64 responds that it does not have the data within, responding computer system 26 contacts another library system 64. Library system 64 indicating the capability to provide the data, as shown in block 94, may have the data within, as shown by block 96, or may access the data from an additional selected library, as shown by block 98. Library system 64 with the data may send the data directly to requesting computer system 24 if it is capable of providing the connection service or may forward the data to responding computer system 26 for delivery to requesting computer system 24.

In the fourth case, responding computer system 26 neither has the data nor is capable of providing the service. In this case, responding computer system 26 automatically contacts library system 64, which may contact another library system 64 until the data is found, and directs that site to send the data directly to requesting computer system 24 if library system 64 with the data is capable of providing the service. Otherwise, responding computer system 26 finds capable broker 64, which may be using the service of another broker 64, to send the data to requesting computer system 24. Capable broker 64 may receive the data directly from library 62 with the data or the data may be relayed through responding computer system 26.

Brokering, either data or service, can have any number of levels. Broker 64 or library 62 at any request level n may indicate to a requestor at level n−1 that it is capable of providing the requested service or has the requested data when it is actually using the services or obtaining the data from a system at level n+1. These actions may be transparent to requesting computer system 24, appearing as if data and services come directly from responding computer system 26.

If responding computer system 26 answers request 80 by indicating that the data can be accessed but capability to provide the service is not available, as shown in block 100, two cases exist. In the first case, responding computer system 26 does not have the requested data and responding computer system 26 contacts library system 64 as described above. In the second case, responding computer system 26 has the requested data. In either case, responding computer system 26 is not directly or indirectly capable of providing the requested service. Requesting computer system 24 must then contact broker system 62 directly, as indicated by block 102.

Requesting computer system 24 may contact broker system 62 as indicated by 104. As described above, if broker system 62 responds as capable, it may either provide the service 90 or solicit another broker system 62 to provide the service 92.

Figure 3:
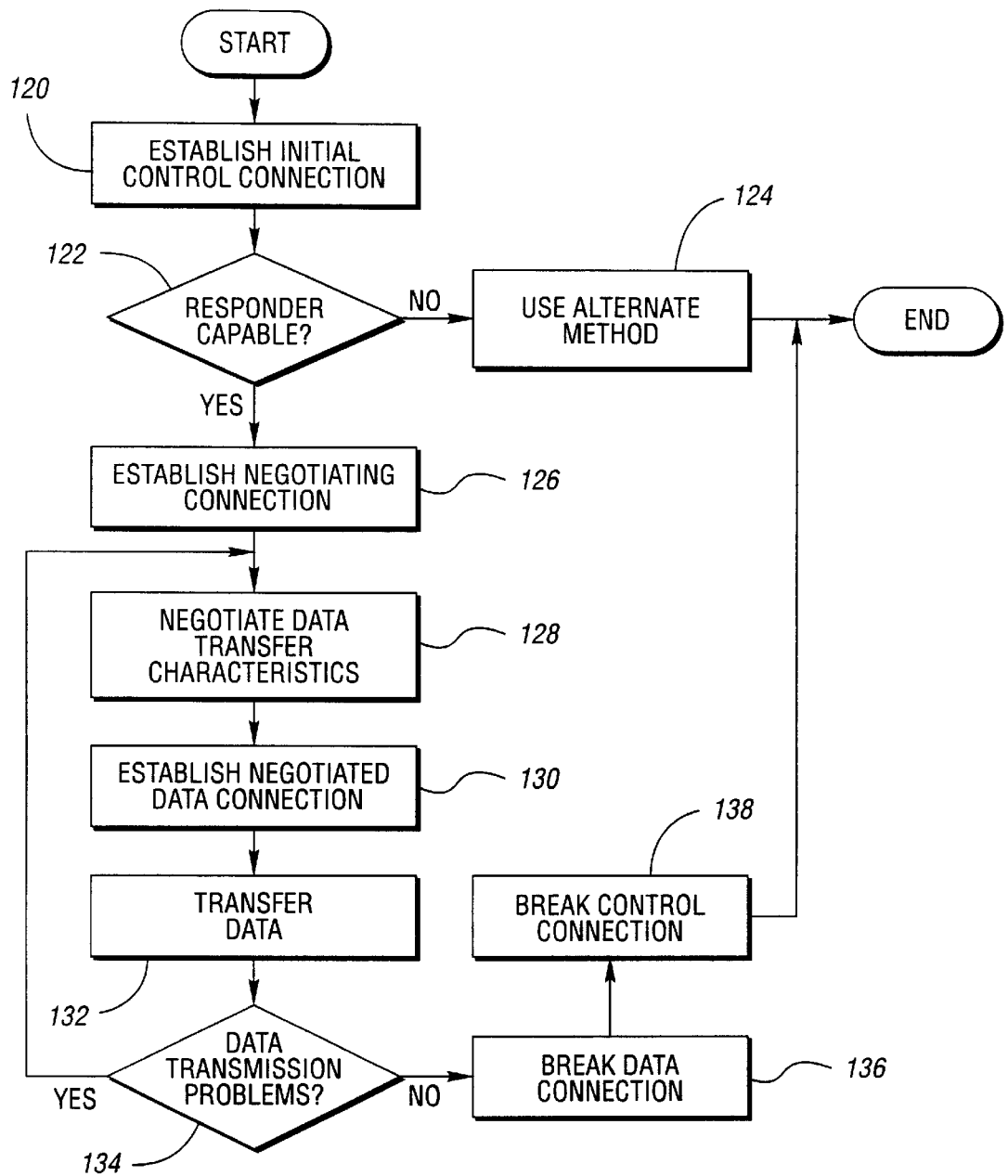
FIG. 3 is a flow diagram illustrating an embodiment of the present invention.
Figure 4:
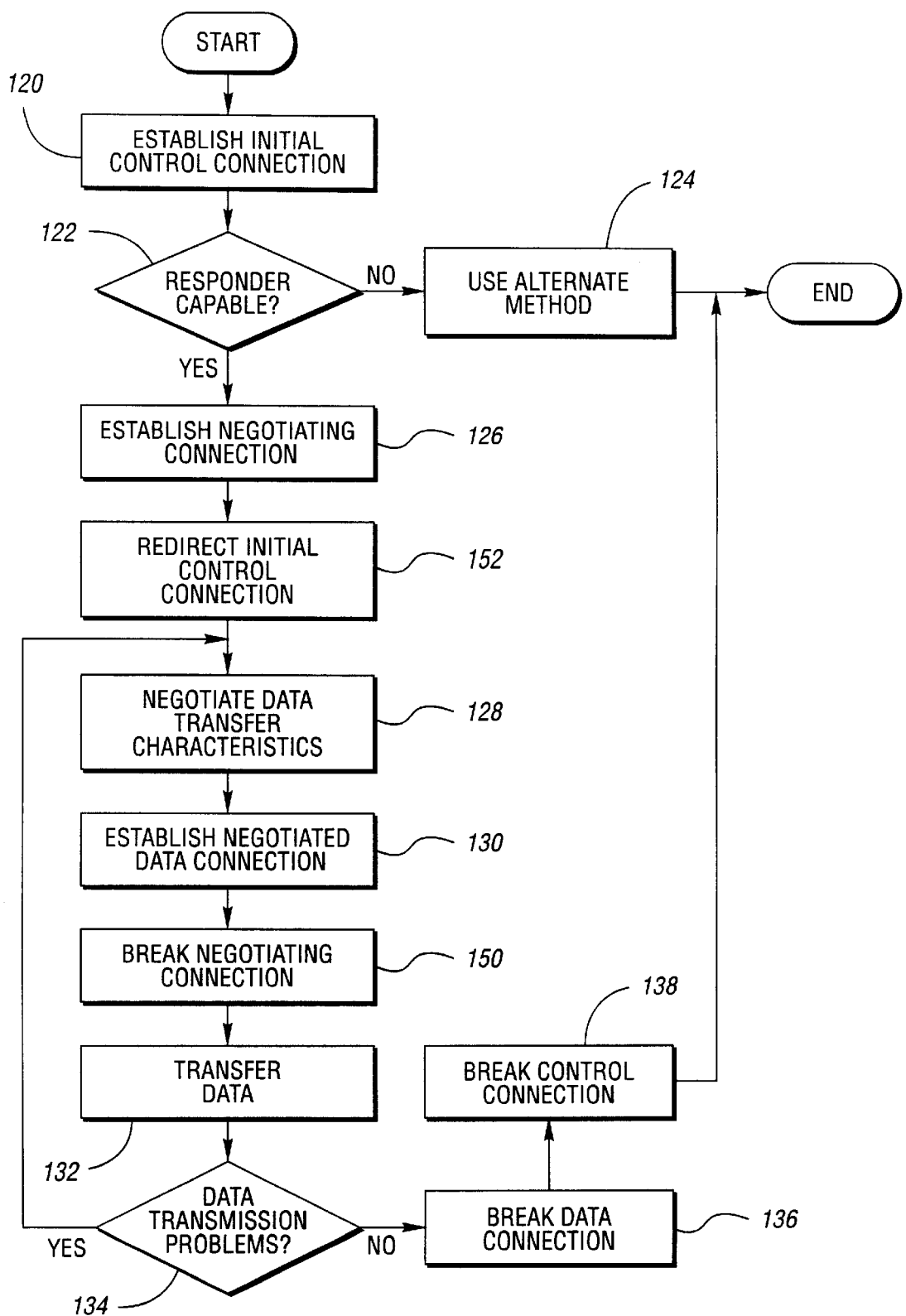
FIG. 4 is a flow diagram of an alternative embodiment of the present invention showing a second control connection type.
Figure 5:
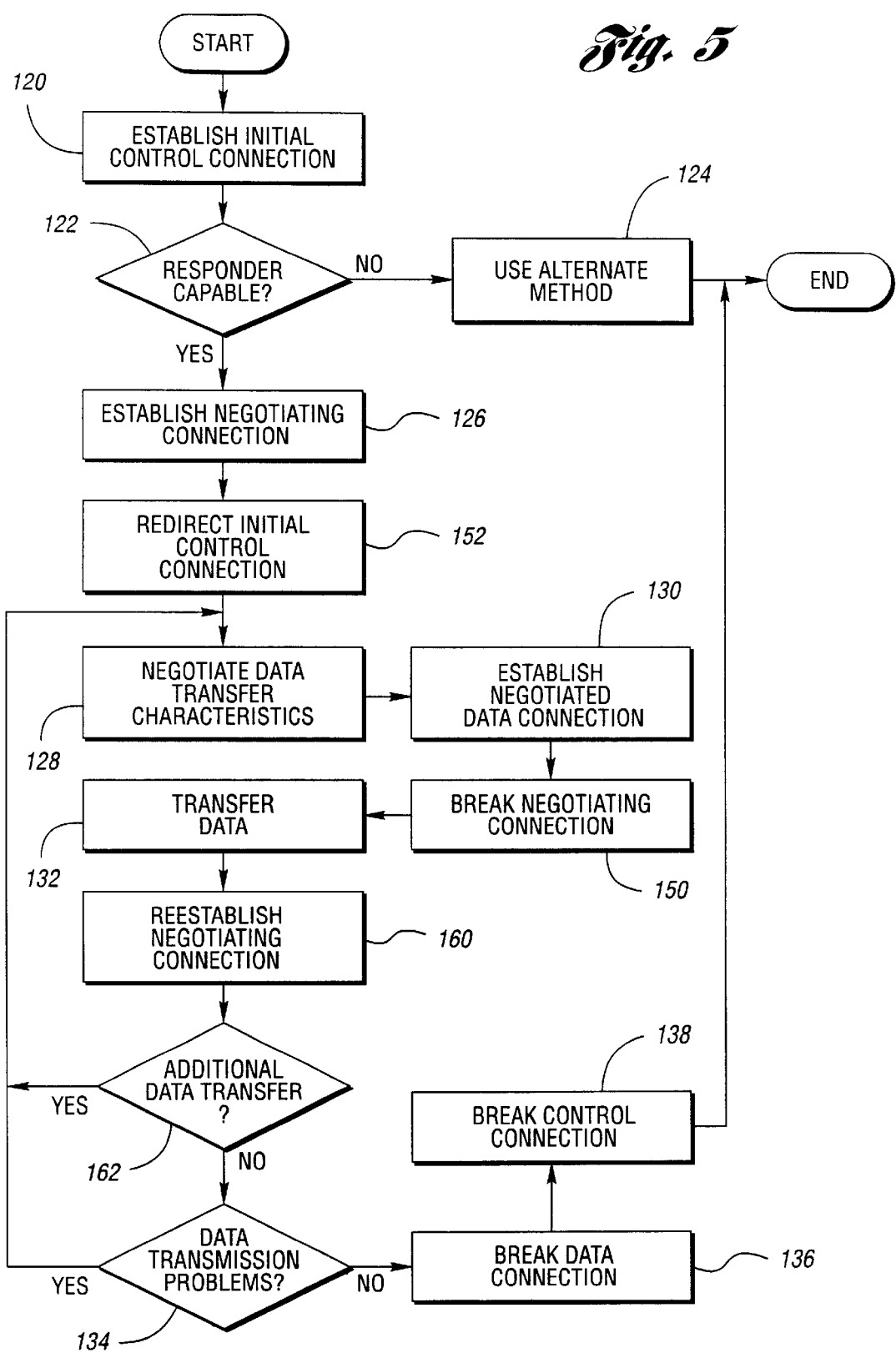
FIG. 5 is a flow diagram of an alternative embodiment of the present invention showing a third control connection type.

Referring now to FIGS. 3 through 5, flow diagrams of various control connection types according to the present invention are shown. As will be appreciated by one of ordinary skill in the art, the operations illustrated in the flow diagrams are not necessarily sequential operations. Similarly, operations may be controlled by software, hardware, or a combination of both. The present invention transcends any particular implementation and the embodiment is shown in a sequential flow chart form for ease of illustration.

Referring now to FIG. 3, a flow diagram of an embodiment of the present invention is shown. The flow diagram describes a method of communication for use by requesting computer system 24.

An initial control connection is established in block 120. Initial control connection 56 verifies that responding computer system 26 is active and provides a connection for checking the capabilities of responding computer 26. In a preferred embodiment, communication path 28 used to establish initial control connection 56 is one from a set including dial up to the internet, dedicated connection to the internet, and direct dial to a known responding computer system.

In a preferred embodiment, the capability of the responder is checked in block 122. If responding computer system 26 is not capable of performing the present invention, an alternate communication method may be used as in block 124. Alternatives include practicing a previously known method of communication or going through broker system 62 as is described with regards to FIGS. 1 and 2 above. If responding computer system 26 is capable, negotiating control connection 56 is established.

Negotiating control connection is established in block 126. Requesting computer system 24 can negotiate with responding computer system 26 over control connection 56 to negotiate the terms of data transfer. Negotiating control connection 56 may be a continuation of initial control connection 56 or may utilize a different path 28. In a preferred embodiment, negotiating control connection 56 is based on user preferences.

The characteristics of data transfer are negotiated in block 128. Negotiations can be used to determine the type of control connection, the type and number of data paths, data transfer performance levels, and security measures. The use of control connection 56 is further described with regards to FIGS. 1 and 2 above. Data transfer characteristics can be based on one or more of user preferences, communication resource capacity and availability, and the quantity of data to be transferred.

Data connection is established in block 130. At the appropriate time, requesting computer system 24 establishes a temporary data connection 58 using at least one path 28 through communication system 20 to responding computer system 26. Additional description of data connection 58 is described with regards to FIG. 1 above.

Data is transferred in block 132. Data may be received by requesting computer system 24, sent by requesting computer system 24, or both as part of the data transfer operation.

In a preferred embodiment, communication paths used for data transfer and negotiating control connections may be dynamically allocated during data transfer based upon at least one parameter from a set of parameters comprising number of paths, types of paths, cost of using paths, usage of paths, demand for paths, and user preferences. For example, if requesting computer system 24 is currently using all available modems for a first data transfer and the user initiates a request for a second data transfer, some of the modems may be released from the first data transfer to service the second data transfer in parallel with the first data transfer. The dynamic allocation of communication resources may require further negotiation between requesting computer system 24 and responding computer system 26.

A check for data transmission problems is made in block 134. If problems were encountered, data transfer characteristics are renegotiated.

Data connection is broken in block 136. Once all data transfer is complete, communication paths 28 used to form data connection 58 are released.

Control connection is broken in block 138. Closing control connection 56 terminates the communication process.

Referring now to FIG. 4, a flow diagram of an alternative embodiment of the present invention showing a second control connection type is shown. The method shown in FIG. 4 is similar to the method of FIG. 3 except that negotiating control connection 56 is broken after data connection 58 is established as in block 150. This allows negotiating control connection 56 to be used to begin additional communication processes according to the present invention. Hence, several simultaneous data transfers are supported.

Furthermore, this embodiment allows for separate initial control and negotiating connections 56. If a separate negotiating control connection 56 is determined in block 126, the initial control connection can be redirected to another responder computer system 26 as in block 152.

Referring now to FIG. 5, a flow diagram of an alternative embodiment of the present invention showing a third control connection type is shown. The method shown is FIG. 5 is similar to the method of FIG. 4 except that negotiating control connection 56 is reestablished once data transfer is complete as in block 160. This allows control connection 56 to be used for establishing additional data connections 58 during data transfer and allows control connection 56 to be used in determining if additional data transfers over existing data connection 58 will occur as in block 162 before breaking existing data connection 58.

In a preferred embodiment, the present invention is operative to perform each method described with regards to FIGS. 3 through 5.

The methods described with regards to FIGS. 3 through 5 above have been presented for requesting computer system 24 establishing data transfer with responding computer system 26. The methods also apply to requesting computer system 24 establishing data transfer with capable library system 64 or broker system 62. The methods also apply to capable library system 64 or broker system 62 establishing data transfer with requesting computer system 24 as may occur when responding computer system automatically solicits brokering from library system 64 or broker system 62 or both.

While the best modes for carrying out the invention have been described in detail, other possibilities exist within the spirit and scope of the present invention. Those familiar with the art to which this invention relates will recognize various alternative designs and embodiments for practicing the invention as defined by the following claims.

What is claimed is:

1. A communication system comprising:
   a requesting computer system;
   a responding computer system; and
   a plurality of communication paths operable to establish a plurality of connections between the requesting computer system and the responding computer system;
   wherein the requesting computer system is operable to
   (a) establish a temporary initial control connection with the responding computer system through a first communication path,
   (b) establish a temporary negotiating connection with the responding computer system through a second set comprising at least one communication path, p2
   (c) negotiate data transfer characteristics with the responding computer system using the temporary negotiating connection,
   (d) establish a temporary data connection with the responding computer system through a third set comprising at least one communication path based on the negotiated data transfer characteristics, the third set not including the first communication path.

2. A communication system as in claim 1 wherein the first communication path is one from a set comprising dial up to the internet, dedicated connection to the internet, and direct dial to a known responding computer system.

3. A communication system as in claim 1 wherein the requesting computer system is further operable to determine if the responding computer system accepts the temporary initial control connection with the requesting computer system, accepts the negotiating control connection, negotiates data transfer characteristics, and accepts the temporary data connection.

4. A communication system as in claim 1 wherein the requesting computer system is further operable to determine the negotiating control connection and to determine data transfer characteristics based on user preferences.

5. A communication system as in claim 1 wherein the negotiating control connection type is determined as one from a set comprising maintaining the negotiating control connection throughout data transfer, closing the negotiating control connection after data transfer begins and not reestablishing the negotiating control connection, and closing the negotiating control connection after data transfer begins and reestablishing negotiating control connection after data transfer is complete.

6. A communication system as in claim 1 wherein the third set of at least one communication path comprises a plurality of communication paths and wherein the requesting computer system further comprises a medium manager operable to dynamically allocate communication paths based on preset rules.

7. A communication system as in claim 6 wherein the plurality of communication paths comprise at least one data path over a first medium and at least one data path over a second medium.

8. A communication system as in claim 6 wherein the third set of communication paths are allocated based on at least one parameter from a set of parameters comprising number of communication paths, types of communication paths, cost of using communication paths, usage of communication paths, demand for communication paths, and user preferences.

9. A communication system as in claim 6 wherein the medium manager is operable to negotiate with the responding computer system to determine allocation of communication paths.

10. A communication system as in claim 1 wherein the requesting computer system is further operable to establish fault tolerant transmission through the temporary data connection.

11. A method for temporary communication between a requesting computer system and a responding computer system operable to be connected to the requesting computer system through a plurality of communication paths, the method comprising:

establishing an initial control connection between the requesting computer system and the responding computer system through a first communication path;

establishing a negotiating control connection between the requesting computer system and the responding computer system through a second set of at least one communication path;

negotiating data transfer characteristics between the requesting computer system and the responding computer system through the negotiating control connection;

establishing a temporary data connection between the requesting computer system and the responding computer system using a third set of at least one communication path, the selection of the at least one communication path based on the negotiated data transfer characteristics; and transferring data between the responding computer system and the requesting computer system using the established temporary data connection.

12. A method for temporary communication as in claim 11 further comprising breaking the negotiating control connection after establishing the data connection.

13. A method for temporary communication as in claim 12 further comprising reestablishing the negotiating control connection after data has been transferred.

14. A method for temporary communication as in claim 11 wherein negotiating data transfer characteristics comprises determining security measures to be used in establishing a temporary data connection and in transferring data.

15. A method for temporary communication as in claim 11 further including dynamically allocating paths during data transfer based upon at least one parameter from a set of parameters comprising number of paths, types of paths, cost of using paths, usage of paths, demand for paths, and user preferences.

16. A communication system comprising:

a requesting computer system requesting data to be transferred at a specified level of data transfer performance;

a responding computer system in communication with the requesting computer system, the responding computer system operable to access the requested data and to indicate to the requesting computer system that the responding computer system is not capable of transferring the requested data at the specified level of data transfer performance;

a broker system in communication with the responding computer system, the broker system operative to obtain the requested data; and a plurality of communication paths between the requesting computer system and the broker system;

wherein the requesting computer system is operable to
(a) establish a temporary initial control connection with the broker system through a first communication path,
(b) determine if the broker system is a capable broker system capable of transferring the requested data at the specified level of data transfer performance,
(c) establish a temporary negotiating connection with the capable broker system through a second set comprising at least one communication path,
(d) negotiate data transfer characteristics with the capable broker system using the temporary negotiating connection, and
(e) establish a temporary data connection with the capable broker system through a third set comprising at least one communication path based on the negotiated data transfer characteristics.

* * * * *